United States Patent [19]

Jeffers

[11] Patent Number: 5,025,163
[45] Date of Patent: Jun. 18, 1991

[54] RADIOGRAPHIC IMAGING SCREEN

[75] Inventor: Frederick J. Jeffers, Escondido, Calif.

[73] Assignee: Eastman Kodak Company, Rochester, N.Y.

[21] Appl. No.: 444,507

[22] Filed: Dec. 1, 1989

[51] Int. Cl.$^5$ .............................................. G21K 4/00
[52] U.S. Cl. .................................................. 250/483.1
[58] Field of Search ...................................... 250/483.1

[56] References Cited

U.S. PATENT DOCUMENTS

| | | | |
|---|---|---|---|
| 3,872,309 | 3/1975 | De Belder et al. | 250/483.1 |
| 4,256,965 | 3/1981 | Lucian | 250/367 |
| 4,795,910 | 1/1989 | Henderson et al. | 250/483.1 |

OTHER PUBLICATIONS

A. M. Glass, P. F. Liao, J. G. Bergman, and D. H. Olson, "Interaction of Metal Particles with Adsorbed Dye Molecules: Absorption and Luminescence", *Optics Letters*, vol. 5, No. 9, (Sep. 1980), pp. 368-370.

*Primary Examiner*—Constantine Hannaher
*Attorney, Agent, or Firm*—William F. Noval

[57] ABSTRACT

An improved radiographic imaging screen is disclosed in which microscopic high-Z metal particles are coated with or dispersed in luminescent material and formed as a layer on a substrate. The complete surrounding of each particle with the luminescent material assures that secondary electrons emitted from the particles from absorption of incident radiation photons will encounter the luminescent material regardless of the direction of emission of the electrons.

8 Claims, 1 Drawing Sheet

RADIOGRAPHIC IMAGING SCREEN

FIELD OF INVENTION

This invention relates to improved image screens for radiography and more particularly to screens for converting radiation photons, such as X-rays or gamma rays in the 60 to 80 keV energy range into visible images which may be stored on film.

BACKGROUND OF INVENTION

Radiography screens are well known and take various forms. As an example, U.S. Pat. No. 3,872,309 discloses a sheet of a high atomic number (high-Z) metal and a sheet of a fluorescent material bonded together onto a suitable substrate. The high-Z metal sheet is effective to absorb incident radiation photons, such as X-rays or gamma rays. The patent cites, as an example, X-rays of 60 keV energy level. Absorption of the radiation results in the emission of primary electrons and secondary electrons. The secondary electrons which are emitted in the direction of the adjacent sheet of fluorescent material cause the fluorescent material to emit photons of light which can be used to expose photographic film to provide a permanent record of the radiographic image. As described in the patent, the particular fluorescent material is chosen such that its light emission wavelength is optimally matched to the spectral sensitivity of the silver halide emulsion.

In another example disclosed in U.S. Pat. No. 4,256,965, a high energy fluoroscopic screen is described that employs a high-Z foil to convert incident high energy X-ray photons into secondary radiation that, in turn, causes a contiguous phosphor layer to luminesce and emit light which is gathered by a polycellular image converter. The light from the image converter is then sensed by a low light level TV camera/monitor chain for direct viewing of the image.

Such screens are relatively effective in converting high energy incident photon radiation, such as X-rays and gamma rays, into visible light emissions or light emissions that spectrally matched to film emulsions for recording. However, because of the geometry of the screens using separate, contiguous layers of high-Z and luminescent materials, at least half of the conversion efficiency is lost by virtue of the fact that only the forward secondary emissions from the high-Z layer reach the luminescent layer.

It is therefore an object of the invention to provide a radiographic imaging screen that converts a high percentage of incident radiation photons into light.

It is a further object of the invention to provide a radiographic imaging screen that effectively converts secondary electron emissions resulting from radiation absorption into visible light irrespective of the direction of travel of the emitted secondary electrons.

It is a further object of the invention to provide a radiographic imaging screen having improved efficiency of conversion of absorbed radiation photons into visible light photons.

SUMMARY OF INVENTION

In accordance with the invention, therefore, a radiographic imaging screen is provided which comprises a plurality of high-Z metal particles formed in a layer on a radiation photon transparent substrate with each of the particles completely surrounded by an electron responsive luminescent material. With such an arrangement, secondary electrons emitted from the particles encounter the luminescent material regardless of the direction of travel of the electrons, thereby increasing the efficiency with which incident radiation photons are converted into visible light. Preferably the metal particles are spherical in shape and, for incident X-ray photons in an energy range 60 keV to about 80 keV, are not greater than about 5 microns in size to assure escape of substantially all of the secondary electrons from the interior of the particle. The small particles make possible the high resolution needed for quality X-ray images. The high-Z particle may consist of any high atomic number metal capable of absorbing incident radiation photons in the indicated energy range to liberate secondary electrons and at the same time, for a given diameter particle, allow emission (escape) of substantially all of the secondary electrons from the particle.

The particles may be coated with the luminescent material and subsequently deposited as a layer on the substrate held in place by means of a binder transparent to both radiation photons and visible light. Alternatively, the particles may be uniformly dispersed as a suspension in the luminescent material which is then coated as a layer on the substrate.

DETAILED DESCRIPTION

Figure 1:
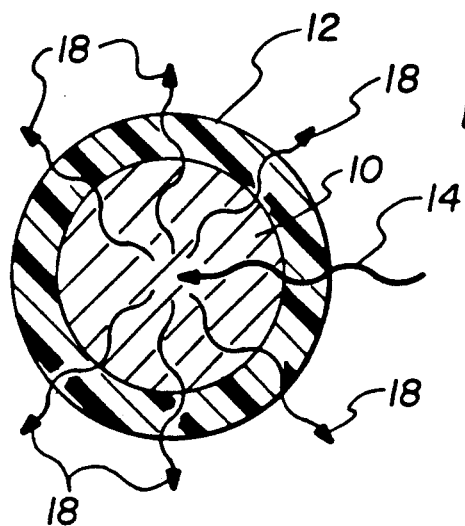
FIG. 1 is a diagrammatic representation of a high-Z particle with luminescent coating useful in the imaging screen of the invention.

In FIG. 1 the basis of the invention is illustrated by a particle of high-Z metal 10, which may be spherically shaped, being completely surrounded by a coating of luminescent material 12. When a photon of incident radiation 14 is absorbed by the high-Z metal particle, secondary electrons 18 are released in random directions as shown. Because the coating of luminescent material 12 completely surrounds the particle 10, all secondary electrons which escape from the particle encounter the luminescent coating thereby enabling the production of photons of visible light. Proper sizing of the particle will assure that substantially all of the secondary electrons will escape from the particle. For example, it can be shown that with incident X-rays of 60–80 keV, particles of about 5 microns in diameter will allow substantially all of secondary electrons to escape.

Figure 2:
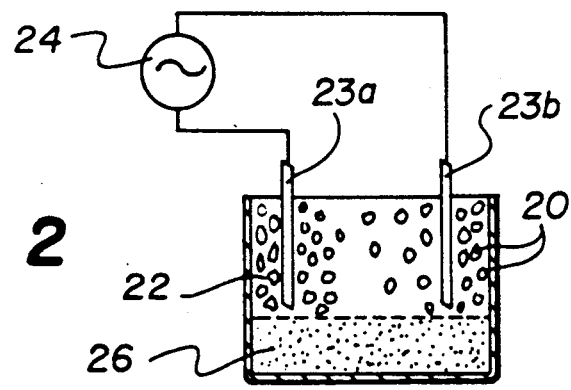
FIG. 2 is a schematic representation of a process for producing high-Z particles useful in the radiographic imaging screen of the invention.

Coated particles as shown in FIG. 1 can be produced in a variety of known ways. For example, the selected high-Z material can be ball milled to the proper size and subsequently slurried with a liquid mixture of the luminescent material. Alternatively, the coated particles can be produced directly by the process of spark machining schematically illustrated in FIG. 2. In this process, larger particles 20 of the selected high-Z metal suspended in a dielectric liquid 22 containing thiourea are subjected to a high potential alternating electric field applied by electrodes 23a, 23b from voltage source 24 which causes the particles to break up and form into microscopic spheres 26. The existence of thiourea and appropriate dopants, such as copper chloride, in the liquid can result in a cadmium sulfide (CdS) luminescent coating being formed on the spheres 26.

Examples of suitable high-Z metals useful for particle 10 are bismuth (Bi), tungsten (W), osmium (Os) or tantalum (Ta). Examples of suitable luminescent materials useful for the coating 12 are cadmium sulfide (CdS), zinc oxide (ZnO), zinc sulfide (Zns) or CdSe.

Figure 3:
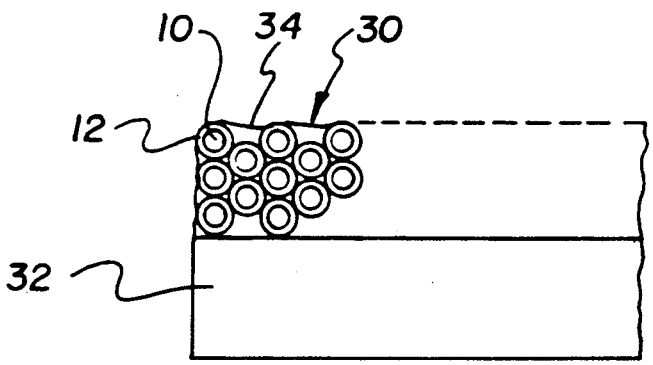
FIG. 3 is a schematic side cross section view of a radiographic imaging screen illustrating one embodiment of the present invention.

In FIG. 3, a segment of a radiographic imaging screen is shown in which a layer 30 of coated particles as described in FIG. 1 is deposited on a radiation transparent substrate 32 and held on the substrate by means of a suitable binder 34, such as urethane or polymethylmethacrylate. Preferably the binder should be transparent to both the incident radiation as well as to the visible light photons generated by the luminescent coating on the particles. It can be shown that a substantial percentage, e.g. two thirds, of incident X-rays at energy levels of 60 to 80 keV can be stopped by a layer of high-Z material 100 microns thick. Consequently, a suitable image screen can be made by depositing the coated particles on the substrate, more or less closely packed, in a layer about 100 microns in depth. Thinner layers may be employed to increase image resolution, as little as about 50 microns, however, the thinner the layer the lower the absorption efficiency of the screen. Although absorption efficiency can be further enhanced by increasing the thickness beyond 100 microns, the thickness is limited by decreasing resolution and increasing light loss as the layer is made thicker.

Figure 4:
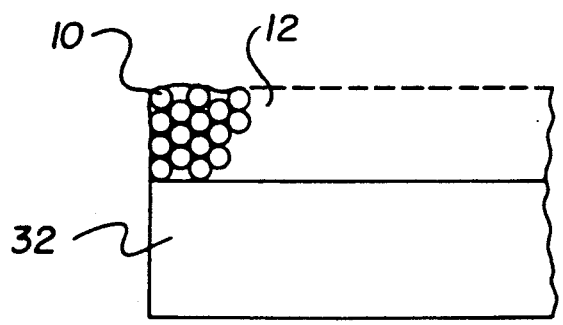
FIG. 4 is a schematic side cross section view of a radiographic imaging screen illustrating another embodiment of the invention.

In FIG. 4, an alternative embodiment of the radiation imaging screen is shown that does not require the precoating of the high-Z particles. The same reference numerals are used for like components from previous figures. In this embodiment, the particles 10 are slurried in a liquid mixture of the luminescent material 12 and then coated to the desired depth and dried directly onto substrate 32. The particles 10, being uniformly dispersed in the luminescent material, are completely surrounded by the luminescent material thus assuring that secondary electrons emitted from the particles in any direction encounter the luminescent material to enable production of visible light photons. In preparing the slurry, the volume packing fraction of the luminescent material and the high-Z particles should suitably adjusted to balance the absorption efficiency of the resulting layer with denser particle packing versus the light emission from the layer since the particles themselves will tend to block the light to some extent.

The invention has been described in detail with particular reference to a presently preferred embodiment, but it will be understood that variations and modifications can be effected within the spirit and scope of the invention.

What is claimed is:

1. A radiographic imaging screen comprising:
a substrate transparent to incident radiation photons;
a composite layer formed on a surface of the substrate including
(a) a substantially uniform distribution of discrete high-Z metal particles adapted to generate secondary electron emissions in any direction from the particle in response to incident high energy radiation photons; and
(b) electron responsive luminescent material completely surrounding and in direct contact with said discrete metal particles in the layer such that secondary electrons emitted from the metal particles encounter the luminescent material regardless of the direction of emission from the particles to thereby enable the generation of visible light photons therefrom.

2. A radiographic imaging screen according to claim 1 in which said particles are each coated with said luminescent material.

3. A radiographic imaging screen according to claim 1 in which said particles are dispersed closely packed in a layer of the luminescent material on the substrate.

4. A radiographic imaging screen according to claim 2 or 3 in which said metal particles are generally spherical in shape.

5. A radiographic imaging screen according to claim 1 in which said incident radiation is comprised of X-ray photons in an energy range of about 60 to 80 keV and in which at least a substantial portion of said particles are not greater than about 5 microns in size.

6. A radiographic imaging screen comprising:
a plurality of discrete high-Z metal particles adapted to generate secondary electron emissions in any direction from the particle in response to incident high energy radiation photons, each of said particles having a coating of electron responsive luminescent material directly contacting said particle such that secondary electrons emitted in any direction from the particles by the incident radiation encounter the luminescent material thereby to enable generation of visible light radiation regardless of the direction of emission of the electrons from the particle;
a substrate transparent to incident radiation photons;
and means transparent to incident radiation and to light generated by the luminescent material for binding said coated particles in a layer on the surface of the substrate.

7. A radiographic imaging screen according to claim 6 in which said metal particles are generally spherical in shape.

8. A radiographic imaging screen according to claim 6 in which said particle spheres are not greater than about 5 microns in diameter.

* * * * *